May 26, 1925.  J. A. BYERS ET AL  1,539,038
PIPE PLUG
Filed April 27, 1922
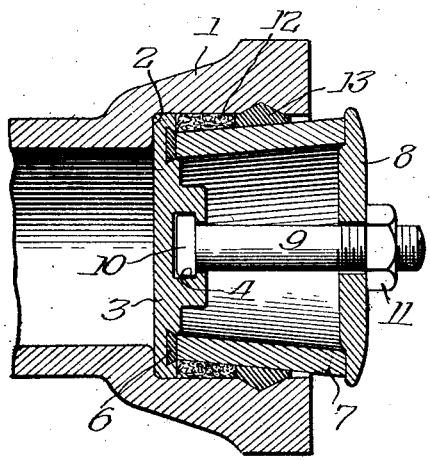
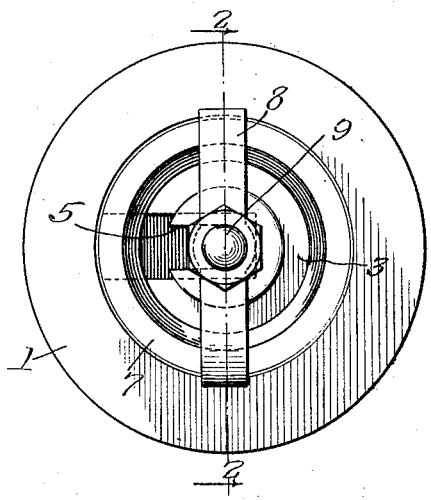
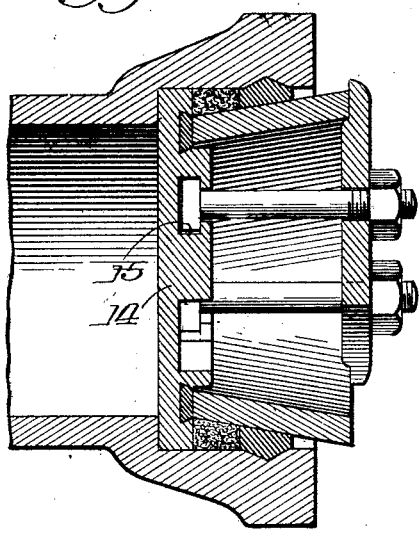
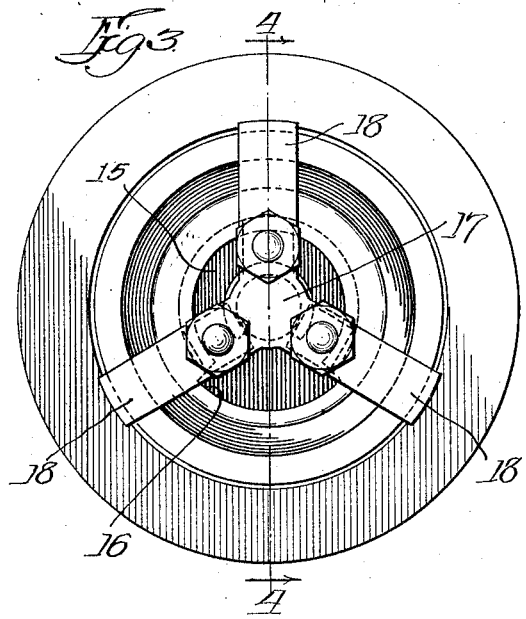

Patented May 26, 1925.

1,539,038

UNITED STATES PATENT OFFICE.

JOHN A. BYERS, OF CHICAGO, ILLINOIS, AND FORREST H. BLANDING, OF COSHOCTON, OHIO, ASSIGNORS TO JAMES B. CLOW & SONS, OF CHICAGO, ILLINOIS, A CORPORATION OF ILLINOIS.

PIPE PLUG.

Application filed April 27, 1922. Serial No. 557,012.

*To all whom it may concern:*

Be it known that we, JOHN A. BYERS and FORREST H. BLANDING, citizens of the United States, and, respectively, residents of Chicago, in the county of Cook and State of Illinois, and of Coshocton, in the county of Coshocton and State of Ohio, have invented a certain new and useful Improvement in Pipe Plugs, of which the following is a full, clear, concise, and exact description, reference being had to the accompanying drawing, forming a part of this specification.

The present invention relates to pipe plugs to be used to close the end of a pipe for testing purposes or to effect a temporary closure of a pipe installed for use. The object of the invention is the provision of a pipe plug which may be easily applied to a pipe and which will effectively seal it and which nevertheless may be easily removed.

In the drawings,—

Figure 1 is an end elevation of the plug applied to a pipe.

Figure 2 is a section on the line 2—2 in Figure 1.

Figure 3 is an end elevation showing a modified form of plug, and

Figure 4 is a section on the line 4—4 in Figure 3.

The plug is to be applied to the bell end 1 of any ordinary pipe in which is formed an annular shoulder 2. The plug comprises a solid imperforate plate 3 adapted to be seated on the shoulder 2 of the pipe. The plate is formed with an undercut slot 4 on its outer face, having a lateral opening 5. Preferably the plate is formed with an annular undercut groove in its outer face in which is seated a ring of lead 6. A frusto-conical shell 7, which is open at both ends, is seated on the outer surface of the plate 3, preferably on the lead ring 6. An arm 8, separable from the shell 7, spans the outer end of the shell with its ends resting on the shell. A bolt 9 has its head 10 slipped into the slot 4 and extends through the plate 8, while the nut 11 is threaded on the outer end of the bolt. In applying the plug to a pipe the plate 3 is seated on the shoulder 2 of the pipe and an annular packing 12, preferably of jute, is seated on the plate. Beyond the packing 12 there is also preferably used an annular packing of lead 13, preferably seated in a groove in the pipe. The shell is then seated on the plate and the head of the bolt slipped into the slot of the plate. The arm 8 is then slipped over the bolt and the nut 11 tightened to clamp the shell between the plate and arm, thus compressing the packing 12 and 13 and also forcing the shell more or less into the lead ring 6 in the plate 3. As a result, the pipe is completely sealed. The plug may be easily removed by first removing the nut 11 and the arm 8, after which the frusto-conical shell is easily removable. The packing rings 12 and 13 may then be withdrawn and the plate 3 removed from the pipe.

In larger sizes of pipe the modified form illustrated in Figures 3 and 4 is preferably used. In this form the construction and mode of use are in all respects similar to the form shown in Figures 1 and 2, except that the plate 14, instead of being formed with a single transverse slot 4, is formed with an annular undercut slot 15 having a transverse opening 16. The device for clamping the shell against the plate in this form consists of a member 17 having a plurality of radial arms 18 adapted to span and rest upon the shell 7. Each of the arms is provided with a clamping bolt having a head to engage the undercut slot 15. The heads of the bolts are inserted in the slot through the lateral opening 16 and then the device is turned to slide the bolt heads along in the slot until the clamping member is properly positioned with all of the bolts engaging the slot. The pipe is sealed and the plug may be removed in the same manner as in the form first described.

Having thus described our invention, what we claim as new and desire to secure by Letters Patent of the United States is:—

1. In a pipe plug, the combination of an imperforate plate adapted to be seated within a pipe-end and formed in its outer face with an undercut slot having a lateral opening, an open-ended frusto-conical shell seated on the plate, a removable member spanning the outer end of the shell, and a bolt removably engaging the slot and member and adapted to clamp the shell between the plate and member.

2. In a pipe plug, the combination of an imperforate plate adapted to be seated within a pipe-end and formed in its outer face with an undercut slot having a lateral opening, a lead ring secured in the outer face of the plate, an open-ended frusto-conical shell seated on the lead ring, a removable member spanning the outer end of the shell, and a bolt removably engaging the slot and member and adapted to clamp the shell between the plate and member.

3. In a pipe plug, the combination of an imperforate plate adapted to be seated within a pipe-end and formed in its outer face with a circular undercut slot having a lateral opening, an open-ended frusto-conical shell seated on the plate, a member comprising a plurality of radial arms spanning the outer end of the shell, and a plurality of bolts removably engaging the slot and the respective arms and adapted to clamp the shell between the plate and member.

4. In a pipe plug, the combination of an imperforate plate adapted to be seated within a pipe-end and formed in its outer face with a circular undercut slot having a lateral opening, a lead ring secured in the outer face of the plate, an open-ended frusto-conical shell seated on the lead ring, a member comprising a plurality of radial arms spanning the outer end of the shell, and a plurality of bolts removably engaging the slot and the respective arms and adapted to clamp the shell between the plate and member.

5. In a pipe plug the combination of an imperforate plate adapted to be seated within a pipe-end and having an undercut slot with a lateral opening formed in its outer face, an open-ended frusto-conical shell seated on said plate, a member radially spanning portions of said shell at points removed from said plate, and a bolt removably engaging said slot and member to clamp said shell between said plate and member.

6. In a pipe plug, the combination of an imperforate plate adapted to be seated within a pipe and having an undercut slot with a lateral opening formed in its outer face, an open-ended frusto-conical shell seated on said plate for fluid-tight engagement therewith, a member having a plurality of radially extending arms removably engaging portions of the outer end of said shell, and means removably engaging said slot and said member to clamp said shell therebetween.

In witness whereof, we hereunto subscribe our names this 20 day of April, 1922.

FORREST H. BLANDING.
JOHN A. BYERS.